United States Patent Office.

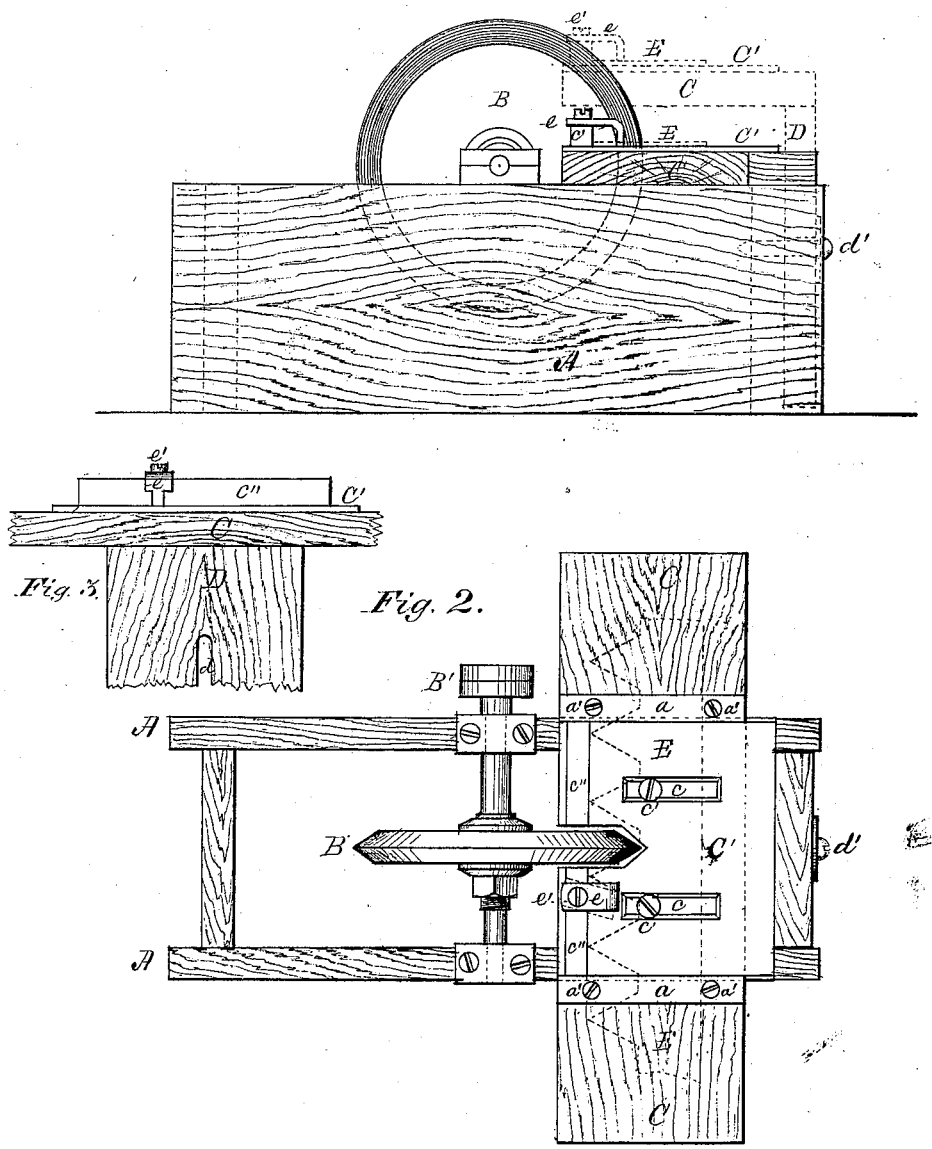

WILLIAM CLEMSON, OF MIDDLETOWN, NEW YORK.

Letters Patent No. 104,830, dated June 28, 1870.

MACHINE FOR GRINDING SAW-TEETH.

The Schedule referred to in these Letters Patent and making part of the same

*To whom it may concern:*

Be it known that I, WILLIAM CLEMSON, of Middletown, in the county of Orange, in the State of New York, have invented certain Improvements in Machines for Grinding the Teeth of Saws, of which the following is a specification.

In the drawing—

Figure 1 is a side elevation of the machine;

Figure 2 is a top plan view of the same; and

Figure 3 is a front view of the adjustable table.

The teeth of common cross-cut saws, after being cut at right angles with the plate, have to be ground to a definite shape, and, as every alternate tooth is set to cut or score the wood on opposite sides of the kerf, the edges of the teeth must have a certain bevel, and to grind the teeth to the required shape and bevel, and have the machine capable of such adjustment as that different sizes of teeth, having different angles with relation to the line of the cutting-points thereof, and having different bevels upon their edges, is the object of this invention; and It consists in the construction and arrangement of the parts that effect the object above named.

A is the frame that supports the operating parts.

B is the usual beveled-edge grinding-wheel, securely and centrally hung on a shaft that may turn in bearings that are attached to frame A, and revolved, in the usual way, by means of a driving-pulley on the shaft.

C is an adjustable table, that can be raised or lowered, and held at any desired height by means of a holding-screw, $d'$, passing through slot $d$ in the front piece D of said table, as seen in dotted lines in fig. 1.

On the top of table C is a sliding metal plate, C', which has slots C cut therein, in such manner that said plate may be adjusted toward or from grinding-wheel B, and is held in any desired position by the holding-screws $c'$.

This plate slides between two parallel ways, $a$ $a$, made fast on the top of table C by the screws $a'$ $a'$.

The table and plate are cut away at their forward edges, to admit the edge of grinding-wheel B to the proper position.

Attached to the forward edge of plate C', and at either side of the grinding-wheel, is a stop-gauge, $c''$, against which the points of the teeth are stopped when the grinding is complete on that tooth.

At one side of the grinding-wheel, and attached to the stop-gauge $c''$, is an adjustable guide or stop, $e$, held in any desired position by the holding-screw $e'$.

Guide $e$ is attached to the top of stop-gauge $c''$, and bent forward and down nearly to the top of plate C', as seen in fig. 1 in dotted lines.

When table C is adjusted at the right height to give the proper bevel to the edges of the teeth, and the stop-gauge $c''$ to give the proper depth, and stop $e$ in the right position, the saw E, seen in fig. 2 in dotted lines, is placed on the table C in such position that an edge of a tooth will come in contact with the beveled side of the grinding-wheel, the saw is advanced toward the grinding-wheel to grind away the edge of the tooth until the points of the teeth strike against the stop-gauge $c''$, and the opposite edge of the tooth, being ground, will strike the guide-stop $e$, and the edge of that tooth is ground to the proper angle and bevel.

Proceed in this way until one edge of all the teeth to be ground on that side is finished in the same manner, when the guide-stop $e$ is adjusted so that the opposite edges of the same teeth will be ground upon the other angle of the grinding-wheel; then turn the saw the other side up, and grind the teeth that set to the other side of the saw in the same manner, when the teeth will all be of the same size, and have the same angle and bevel.

Saws of this character sometimes have every third or fifth tooth shorter than the others, for the purpose of making the short teeth clearing or planing-teeth, to clear the kerf of the sawdust, and such teeth have no set, and their edges are ground at right angles to the plate.

Such teeth can be perfectly ground on this machine by letting table C down so that the saw will be at the same height with the center of the grinding-wheel, and, by raising said table C up, as seen in dotted lines in fig. 1, and adjusting plate C' with stop-gauge $c''$ forward, a very acute bevel will be ground on the edges of the teeth, which, at times, is very desirable, and the want of a machine with such adjustment has long been felt, but this will accomplish the object sought.

The machine is simple in construction and operation, cheap, and durable, and not liable to get out of order.

Having thus described my invention,

What I claim, and desire to secure by Letters Patent, is—

1. The sliding adjustable plate C', having stop-gauge $c''$ and guide $e$, constructed in the manner and for the purpose described.

2. The sliding adjustable plate C', having stop-gauge $c''$ and guide $e$, in combination with the adjustable table C, in the manner and for the purpose described.

3. The adjustable table C, having sliding plate C', stops $c''$ and $e$ arranged thereon, in combination with the grinding-wheel B, in the manner described.

WM. CLEMSON.

Witnesses:
ELISHA P. WHEELER,
G. R. KIMBALL.